United States Patent
Zhang et al.

(10) Patent No.: US 8,340,534 B2
(45) Date of Patent: Dec. 25, 2012

(54) SIDE BAND PILOT TONE FOR DIGITAL SIGNAL PROCESSING IN POLARIZATION MULTIPLEXED COHERENT OPTICAL COMMUNICATION SYSTEM

(75) Inventors: Zhuhong Zhang, Ottawa (CA); Chuandong Li, Ottawa (CA); Fei Zhu, San Jose, CA (US); Yusheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 291 days.

(21) Appl. No.: 12/847,749

(22) Filed: Jul. 30, 2010

(65) Prior Publication Data
US 2011/0033184 A1    Feb. 10, 2011

Related U.S. Application Data

(60) Provisional application No. 61/232,321, filed on Aug. 7, 2009.

(51) Int. Cl.
*H04B 10/06* (2006.01)

(52) U.S. Cl. ........ 398/209; 398/208; 398/206; 398/202; 398/205

(58) Field of Classification Search .......... 398/202, 398/208, 209, 206, 205, 25, 65, 149; 375/229, 375/232, 234
See application file for complete search history.

(56) References Cited

U.S. PATENT DOCUMENTS

| | | | | |
|---|---|---|---|---|
| 731,575 | A * | 6/1903 | Johnston | 132/106 |
| 800,388 | A * | 9/1905 | Montgomery | 83/588 |
| 3,795,865 | A * | 3/1974 | Armstrong | 375/232 |
| 5,661,528 | A * | 8/1997 | Han | 348/607 |
| 7,158,567 | B2 * | 1/2007 | Wang et al. | 375/232 |
| 7,315,575 | B2 * | 1/2008 | Sun et al. | 375/229 |
| 7,457,538 | B2 * | 11/2008 | Strawczynski et al. | 398/33 |
| 7,492,815 | B2 * | 2/2009 | Guo et al. | 375/229 |
| 7,522,841 | B2 * | 4/2009 | Bontu et al. | 398/154 |
| 7,555,227 | B2 * | 6/2009 | Bontu et al. | 398/202 |
| 7,619,964 | B2 * | 11/2009 | Son et al. | 370/210 |
| 7,623,797 | B2 * | 11/2009 | Crivelli et al. | 398/208 |
| 7,627,252 | B2 * | 12/2009 | Sun et al. | 398/155 |
| 7,636,525 | B1 * | 12/2009 | Bontu et al. | 398/208 |

(Continued)

OTHER PUBLICATIONS

Feedforward Carrier Recovery for Coherent Optical Communications Ezra Ip and Joseph M. Kahn, Fellow, IEEE @ Sep. 2007.*

(Continued)

*Primary Examiner* — Kenneth N Vanderpuye
*Assistant Examiner* — Hibret Woldekidan
(74) *Attorney, Agent, or Firm* — Conley Rose, P.C.; Grant Rodolph; Clint Wilkins

(57) ABSTRACT

A method comprising generating a plurality of first symbols that correspond to a side band pilot tone (SBPT) signal for a plurality of data streams, mapping the first symbols into a plurality of second symbols that correspond to a plurality of signal components of the polarization multiplexed (PM) optical signal, and transmitting the second symbols in a plurality of data blocks of a PM optical signal. An apparatus comprising at least one processor coupled to a memory and configured to obtain a data block that comprises a plurality of SBPTs in a received PM optical signal, estimate a set of values for a carrier frequency and a polarization state, update a tap weight of a master equalizer based on the estimated set of values, and update a plurality of slave equalizers based on the updated tap weight of the master equalizer.

9 Claims, 12 Drawing Sheets

U.S. PATENT DOCUMENTS

| | | | | |
|---|---|---|---|---|
| 8,041,233 | B2 * | 10/2011 | Hueda et al. | 398/208 |
| 8,180,228 | B1 * | 5/2012 | Harley et al. | 398/208 |
| 2007/0092259 | A1 | 4/2007 | Bontu et al. | |
| 2011/0103795 | A1 * | 5/2011 | Khandani et al. | 398/65 |
| 2011/0206385 | A1 * | 8/2011 | Chen et al. | 398/208 |
| 2011/0274442 | A1 * | 11/2011 | Zhang et al. | 398/208 |
| 2011/0276861 | A1 * | 11/2011 | Chun et al. | 714/780 |
| 2011/0286648 | A1 * | 11/2011 | Sharif et al. | 382/131 |
| 2012/0008952 | A1 * | 1/2012 | Li et al. | 398/65 |
| 2012/0106982 | A1 * | 5/2012 | Wagner et al. | 398/208 |
| 2012/0155890 | A1 * | 6/2012 | Zhou et al. | 398/208 |

OTHER PUBLICATIONS

Specification and Development of an Equalizer-Demodulator for Wideband Digital Microwave Radio Signals Vincent WolfF, Richard Gooch, and John Treichler @ Oct. 23-26, 1988.*

A QPSW16 QAM Receiver Chip for LMDS Applcation_Ki Hyuk Park et al @ Aug. 30, 200.*

Kazovsky, "Phase-and Polarization-Diversity Coherent Optical Techniques," Journal of Lightwave Technology, vol. 7, No. 2, Feb. 1989, pp. 279-292.

Tseytlin, et al., "Digital, Endless Polarization Control for Polarization Multiplexed Fiber-Optic Communications," MF83, OFC 2003, vol. 1, p. 103.

Leven, et al., "Frequency Estimation in Intradyne Reception," IEEE Photonics Technology Letters, vol. 19, No. 6, Mar. 15, 2007, pp. 366-368.

Noe, "PLL-Free Synchronous QPSK Polarization Multiplex/Diversity Receiver Concept with Digital I&O Baseband Processing," IEEE Photonics Technology Letters, vol. 17, No. 4, Apr. 2005, pp. 887-889.

* cited by examiner

SIDE BAND PILOT TONE FOR DIGITAL SIGNAL PROCESSING IN POLARIZATION MULTIPLEXED COHERENT OPTICAL COMMUNICATION SYSTEM

CROSS-REFERENCE TO RELATED APPLICATIONS

The present application claims priority to U.S. Provisional Patent Application No. 61/232,321 filed Aug. 7, 2009 by Zhuhong Zhang et al. and entitled, "Side Band Signaling in Polarization Multiplexed Coherent Optical Communications," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In optical communications, many modulation schemes have been used to transport data. On-Off keying (OOK) is one modulation scheme that has been used, where data is encoded using signal intensity variation. OOK introduces strong characteristic tones in the signal frequency domain, which can be detected as periodic intensity variations in the signal. To detect the signals, a conventional clock recovery scheme is used to obtain the timing information in the tones, such as by filtering the detected signal intensities using a narrow band pass filter. Phase Shift Keying (PSK), Differential PSK (DPSK), Quadrature PSK (QPSK), and Differential QPSK (DQPSK) are other modulation schemes that have been used more recently. In such modulation schemes, the data is encoded using signal phase variation. Quadrature phase based modulation has been widely used for many years to achieve high spectrum efficiency in radio frequency (RF) communications systems, including polarization multiplexed optical communications systems. In polarization multiplexed optical communications systems, two signals are carried on one wavelength at two orthogonal linear polarization states, where one signal is modulated in one of the orthogonal polarization states and the other signal is modulated in the other orthogonal polarization state. The quadrature phase modulation in polarization multiplexed optical communications systems can achieve about a four fold improvement in transmission efficiency, e.g. in comparison to other modulation schemes.

SUMMARY

In one embodiment, the disclosure includes a method comprising generating a plurality of first symbols that correspond to a side band pilot tone (SBPT) signal for a plurality of data streams, mapping the first symbols into a plurality of second symbols that correspond to a plurality of signal components of the polarization multiplexed (PM) optical signal, and transmitting the second symbols in a plurality of data blocks of a PM optical signal.

In another embodiment, the disclosure includes an apparatus comprising at least one processor coupled to a memory and configured to obtain a data block that comprises a plurality of SBPTs in a received PM optical signal, estimate a set of values for a carrier frequency and a polarization state, update a tap weight of a master equalizer based on the estimated set of values, and update a plurality of slave equalizers based on the updated tap weight of the master equalizer.

In yet another embodiment, the disclosure includes an apparatus comprising a master processor configured to estimate phase and carrier frequency in a first portion of a received signal, a plurality of slave processors configured to estimate phase and carrier frequency in a plurality of second portions of the received signals, a demultiplexer coupled to each of the master processor and the slave processors and configured to distribute the first portion and the second portions in parallel between the first processor and the slave processors, a plurality of carrier recovery units coupled in parallel to the master processor and the slave processors, a plurality of decoder units coupled in parallel to the carrier recovery units, and a tap weight calculator coupled to the master processor and one of the decoders that corresponds to the master processor and configured to update the tap weight of master and slave equalizers.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A phase and polarization diversity coherent communications system has been previously introduced, e.g. by L. G. Kazovsky in "Phase- and Polarization-Diversity Coherent Optical Techniques", J. of Lightwave Technology, Vol. 7, No. 2, 1989, which is incorporated herein by reference as if reproduced in its entirety. However, two aspects of the system, signal impairments caused by optical fiber channel and hardware feasibility of digital signal processing (DSP) algorithm, have prevented the deployment of the system in communications networks. Additionally, the system may have a plurality of signal degradation sources, such as chromatic dispersion, laser phase noise, nonlinear phase noise and distortion, polarization mode dispersion, polarization dependent loss, bandwidth limiting components, or combinations thereof. Further, nonlinear effects, such as spontaneous phase modulation (SPM) and local oscillator (LO) frequency offset, may rotate the original phase in the received signal. For instance, polarization rotation, e.g. at a rate up to about 20 kilohertz (kHz), may result in receiving a combination of the components of an original transmitted PM signal instead of the correct signal. To remove such signal distortions in the system, adaptive tracking and equalization may be required. For instance, a plurality of methods and DSP algorithms may be needed to identify the initial phase of the original signal to solve phase ambiguity and/or track and identify the initial polarization state of original signal to solve polarization ambiguity, which may be difficult to achieve.

Figure 1:
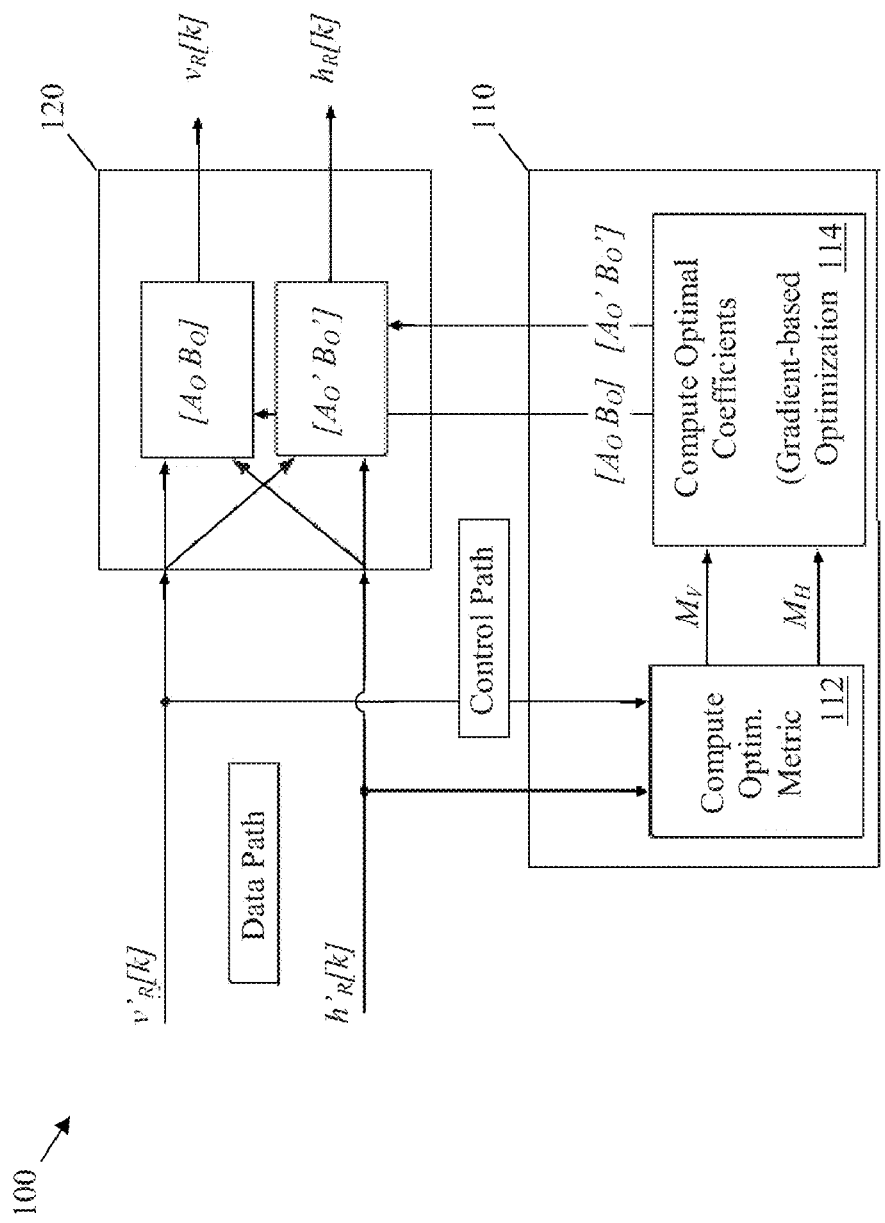
FIG. 1 is a schematic diagram of an embodiment of a digital polarization compensator.

Using PSK methods, such as DQPSK, may solve the phase ambiguity in the received PM optical signal, e.g. at the cost of performance degradation. FIG. 1 shows a digital polarization compensator (DPC) 100 that was proposed by Tseytlin to track the signal polarization in "Digital, Endless Polarization Control for Polarization Multiplexed Fiber-Optic Communications," MF83, at the Optical Fiber Conference (OFC) 2003, which is incorporated herein by reference as if reproduced in its entirety. The DPC 100 may implement a gradient-based optimization algorithm to reconstruct and track the state of polarization of the received signal and to extract the compensation information from the received data, e.g. using a blind algorithm, or from known data, e.g. using a data-aided algorithm. The DPC 100 may comprise a control unit 110 coupled to two received signal components (e.g. $v'_R[k]$ and $h'_R[k]$, where k is a wave vector) that comprise distorted phase. The DPC 100 may also comprise a compensator 120 coupled to the signal components and the control unit 110. The control unit 110 may comprise a first computation unit 112 that computes two optimal metric components (e.g. $M_V$ and $M_H$) using the received signal components, and a second computation unit 114 that computes two pairs of coefficients (e.g. $[A_O B_O]$ and $[A_O' B_O']$) using the optimal metric components. The compensator 120 may then use the two computed pairs of coefficients and the received signals to obtain the two corresponding original transmitted signals (e.g. $v_R[k]$ and $h_R[k]$), which may comprise the initial phase information.

Figure 2:
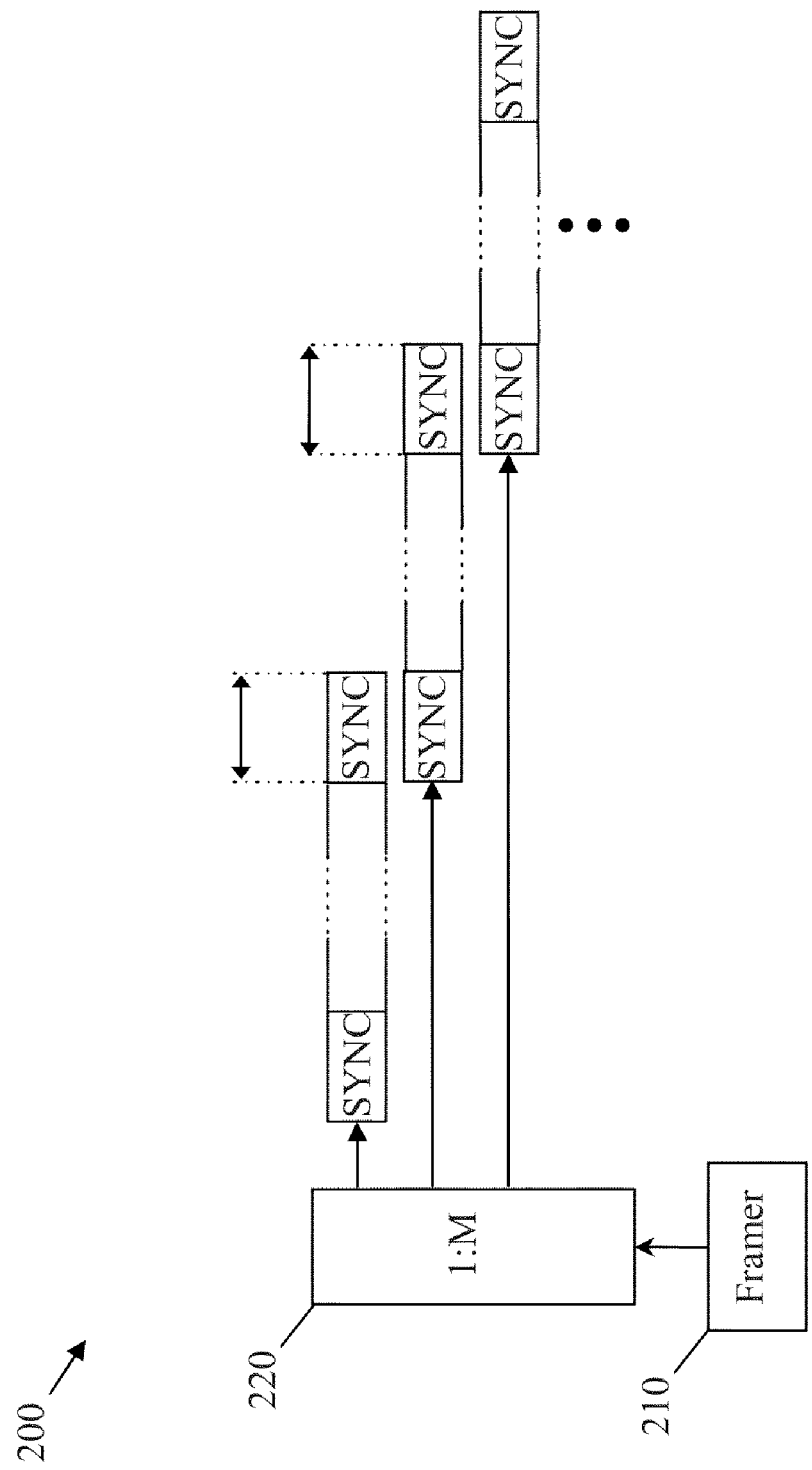
FIG. 2 is a schematic diagram of another embodiment of a sync burst scheme.

The data-aided DSP algorithm that may be used in the DPC 100 is based on training a data sequence (e.g. a unique word) correlation, for instance using a sync burst scheme. FIG. 2 shows a sync burst scheme 200 that was presented by C. Bontu et al. in U.S. Pat. No. 7,522,841, which is incorporated herein by reference as if reproduced in its entirety. The sync burst scheme 200 may use a plurality of predetermined symbols, which are inserted into a data stream periodically to form a sync burst or word (e.g. a unique word), which is then used in a receiver unit to implement the data-aided DSP. The sync word used in the sync burst scheme 200 may be orthogonal, e.g. where a plurality of independent and uncorrelated sync words are used in a plurality of sub-data streams, and white, e.g. based on a Gaussian distribution function. The sync burst scheme 200 may comprise a framer 210 and a 1:M demultiplexer (Demux) 220 coupled to the framer 210, e.g. at the receiver unit. The framer 210 may receive, process, and then send the data stream to the 1:M Demux 220, which may separate the data stream into a plurality of sub-data streams or sub-blocks, based on the sync words in the data stream. Thus, the sub-blocks may be processed in a parallel manner, where each sub-block may comprise a sync word or a portion of the sync word at the beginning and the end of the sub-block. The sync burst method may solve signal phase and polarization ambiguity and provide a means for parallel processing in the receiver, which may simplify application-specific integrated circuit (ASIC) implementation. However, the sync burst method may add a cost of about three percent overhead to the system and increase the ASIC design complexity due to the data overlap between sub-block and independent tap weight updating circuits of each parallel processor.

Figure 3:
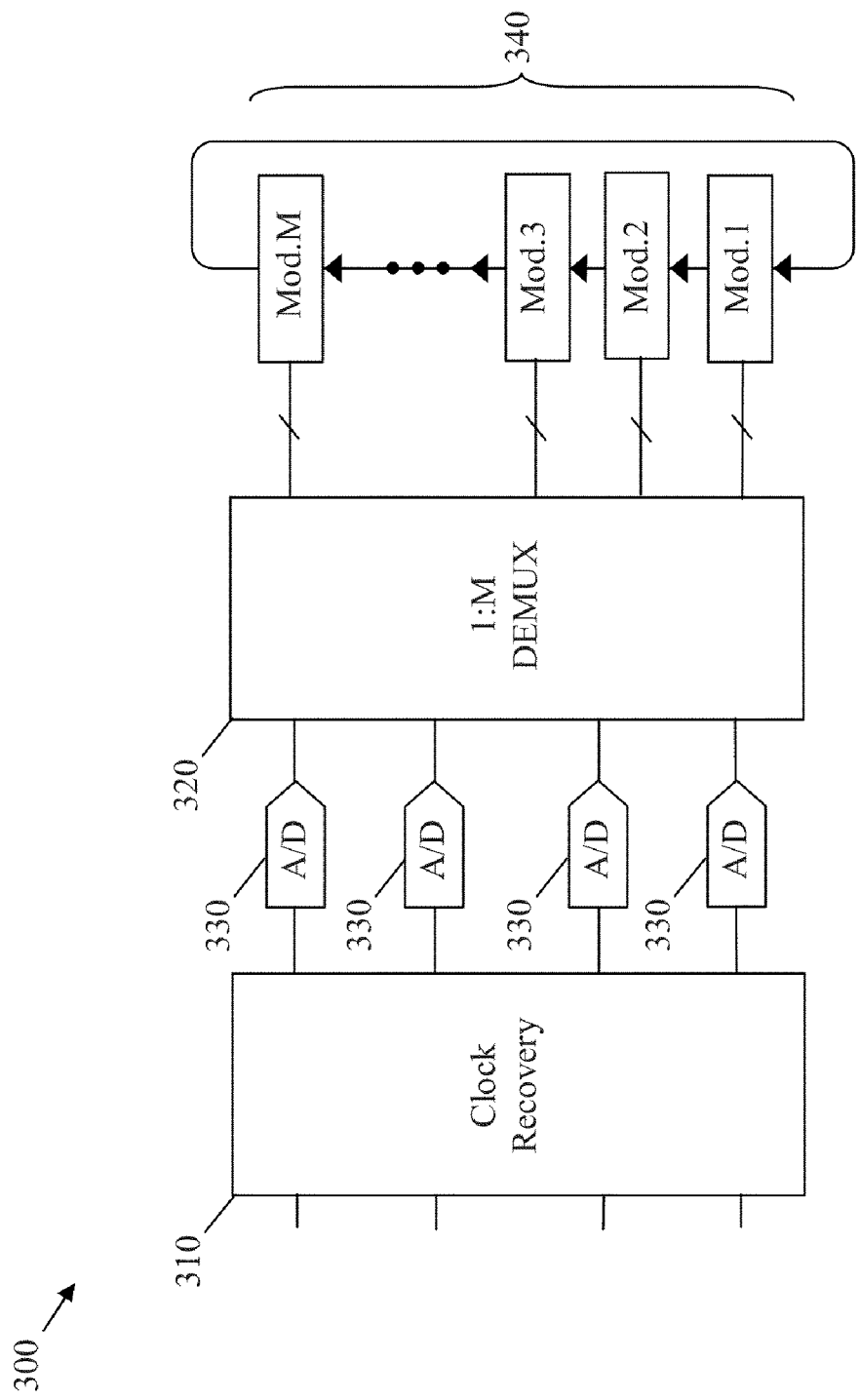
FIG. 3 is a schematic diagram of an embodiment of a parallel processing receiver.

FIG. 3 shows a parallel processing receiver 300 that was proposed by R. Noe in "PLL-free synchronous QPSK polarization multiplex/diversity receiver concept with digital I & Q baseband processing," in the Institute of Electrical and Electronics Engineers (IEEE) Phonics Technology Letters, Vol. 17, No. 4, April 2005, which is incorporated herein by reference as if reproduced in its entirety. The parallel processing receiver 300 may comprise a clock recovery unit 310, a 1:M Demux 320 coupled to the clock recovery unit 310 via a plurality of analog/digital (A/D) converters 330 and to a plurality of corresponding parallel sub-data stream modules 340 (e.g. Mod. 1, Mod. 2, . . . , Mod. M, where M is an integer). The clock recovery 310 may receive a plurality of signal components, retrieve initial phase information, and forward the signal components to the 1:M Demux 320 via the corresponding A/D converters 330. The 1:M Demux 320 may then split the received data path (or signal components) into M parallel streams, which may have a lower sampling rate. The data may then be processed in parallel, e.g. using a plurality of processors. Specifically, the data may be processed in a dependent order between the parallel sub-data stream modules 340, as shown by the arrows in FIG. 3, where the output of each sub-data stream module 340 may be used as an input to an adjacent sub-data stream module 340. Thus, this parallel processing scheme may require communications between each of the processors in ensure processing continuity.

Disclosed herein is a system and method for processing a received signal in a PM coherent optical communications system. The initial phase and the initial polarization state in the received signal may be estimated in the received signal using a plurality of SBPTs in the signal. The SBPTs may be initially transmitted in the PM optical signal, which may comprise a plurality of data blocks, where a SBPT may comprise a plurality of symbols that may be distributed along a data block in the transmitted PM optical signal. When the PM optical signal is received, the data stream in the signal may be processed, e.g. on a block-by-block basis, where each block may be partitioned into a plurality of contiguous sub-blocks. The sub-blocks may be processed in parallel, e.g. using a plurality of parallel processors, where one of the sub-blocks may be processed by a master processor and the remaining blocks may be processed by a plurality of corresponding slave processors. As such, the master processor and the slave processors may process the SBPT symbols in the sub-blocks to estimate a frequency offset and/or correct the phase and polarization state in the signal. Such parallel processing scheme may simplify the system's circuit or logic, e.g. the system's ASIC design.

Figure 4:
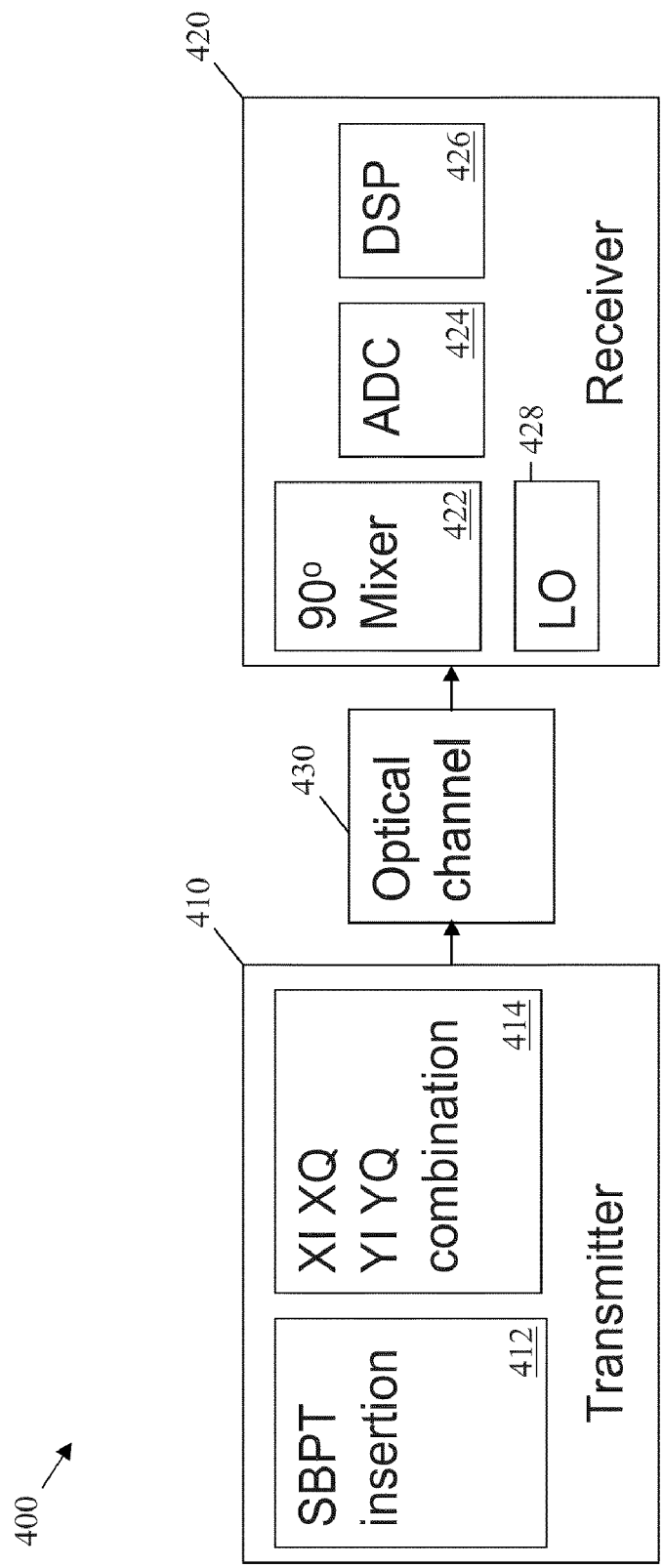
FIG. 4 is a schematic diagram of an embodiment of a polarization multiplexed coherent optical communications system.

In an embodiment, detecting the initial phase and the initial polarization state in the received signal may be improved by transmitting a plurality of SBPTs in the signal. FIG. 4 illustrates one embodiment of a PM coherent optical communications system 400, which may use the SBPTs to solve phase ambiguity and/or polarization ambiguity in a received PM optical signal and simplify system's complexity (e.g. the system's ASIC design), reduce system cost, or both. The PM coherent optical communications system 400 may comprise a transmitter 410 and a receiver 420 that may be coupled to the transmitter 410 via an optical channel 430. The PM coherent optical communications system 400 may use a PSK modulation scheme, such as QPSK or DQPSK.

The transmitter 410 may comprise a SBPT signal control unit 412 and a multiplexer (Mux) 414 coupled to the SBPT signal control unit 412. The SBPT signal control unit 412 may be configured to insert a SBPT signal in a PM optical signal before transmitting the signal to the receiver 420. For instance, the SBPT signal control unit 412 may insert a SBPT signal that comprises a plurality of known or predefined symbols in each of a plurality of data blocks in the PM optical signal, which may have about the same size. The PM optical signal (including the SBPT signal) may then be forwarded in a plurality of parallel data streams, e.g. about ten data streams, to the Mux 414.

The Mux 414 may be configured to convert the incoming parallel data streams into a plurality of signal components, e.g. about four signal components, and then forward the signal components to the receiver 420 via the optical channel 430. As such, the rate of the signal components (e.g. symbol rate) may be equal to about a quarter of the rate of the original PM optical signal. The signal components of the PM optical signal may be transmitted using a non return to zero (NRZ) or return to zero (RZ) modulation format and may have about the same carrier frequency, e.g. the same optical wavelength. The signal components may comprise about two orthogonal phase components, e.g. an in-phase (I) component and a quadratic-phase (Q) component, for each of two orthogonal polarization components, e.g. an X polarization component and a Y polarization component. As such, the transmitter 410 may transmit about four components, e.g. XI, XQ, YI, and YQ, which may be combined and transmitted via the optical channel 430 to the receiver 420. The data blocks in the transmitted PM optical signal may correspond to the different signal components, which may be indicated by polarization information in the blocks, e.g. the blocks' headers.

The receiver 420 may comprise a 90° mixer 422, an analog to digital converter (ADC) 424 coupled to the 90° mixer, a DSP unit 426 coupled to the ADC 424, and a LO 428 coupled to the remaining components. The 90° mixer 422 may comprise an about 90° optical cross network mixer and a photo-detector, e.g. a p-type/intrinsic/n-type (PIN) diode and may be configured to mix the received orthogonal components of the optical signal from the transmitter 410 and split the signal into a plurality of signals, where each signal may be a combination of the orthogonal signal components. The 90° mixer 422 may mix the received optical signal components with an optical signal from the LO 428 that may have a close or about the same carrier frequency of the transmitted optical signal. The output mixed signals from the 90° mixer 422 may then be converted by the ADC 424 (e.g. from analog to digital) and forwarded to the DSP unit 426, which may be configured to process the signals and recover the data in the transmitted signal. The DSP unit 426 may detect the SBPTs in the signals and process the signals in a parallel manner using the SBPTs to estimate the carrier frequency and/or correct the phase of the original signal, as described in detail below. The DSP unit 426 may also separate the data blocks that correspond to the different signal components, e.g. by detecting the polarization information in the blocks, e.g. the blocks' headers.

The optical channel 430 may be configured to transport the PM optical signal from the transmitter 410 to the receiver 420 and as such may comprise a plurality of optical fibers, optical filters, amplifiers, or combinations thereof. Unfortunately, such components of the optical channel 430 may introduce in the signal unwanted chromatic dispersion, nonlinear phase noise, polarization mode dispersion, polarization dependent loss, polarization dependent gain, polarization rotation, optical white Gaussian noise, or combinations thereof.

Figure 5A:
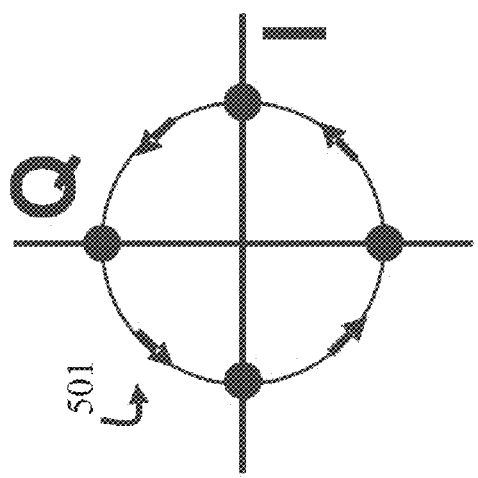
FIGS. 5A, 5B, and 5C are schematic diagrams of embodiments of different modulation schemes.
Figure 5B:
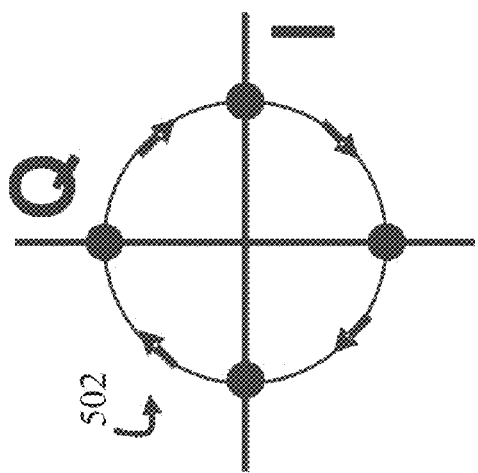
Figure 5C:
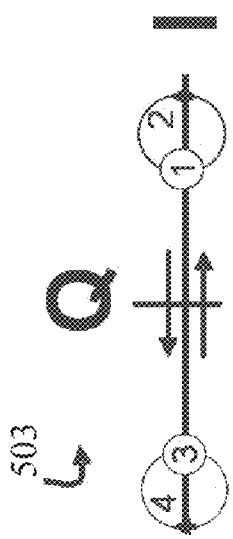

FIGS. 5A, 5B, and 5C illustrate embodiments of different modulation schemes that may be used to modulate a transmitted PM optical signal and similarly the SBPT signal, e.g. in the PM coherent optical communications system 400. The modulation schemes may comprise a counter-clockwise QPSK scheme 501 shown in FIG. 5A, a clockwise QPSK scheme 502 shown in FIG. 5B, and a low rate toggled binary PSK (BPSK) scheme 503 (e.g. relative to the signal rate) shown in FIG. 5C. Specifically, any of the three modulation schemes may be used to modulate the SBPT symbols that may be inserted in the data blocks of the PM optical signal. Similarly, the same modulation scheme may also be used to modulate the remaining data symbols in the data blocks of the PM optical signal. As shown in FIGS. 5A, 5B, and 5C, each of the modulation schemes may be used to modulate the symbols that correspond to the orthogonal components of the transmitted PM optical signal, e.g. e.g. XI, XQ, YI, and YQ. For instance, a plurality of data blocks that may be transmitted from the transmitter 410 may comprise counter-clockwise QPSK symbols, clockwise QPSK symbols, or low rate toggled BPSK symbols. In other embodiments, other modulation schemes may be used to modulate the transmitted PM optical signal including the SBPT signal, such as DPSK or DQPSK.

Figure 6:
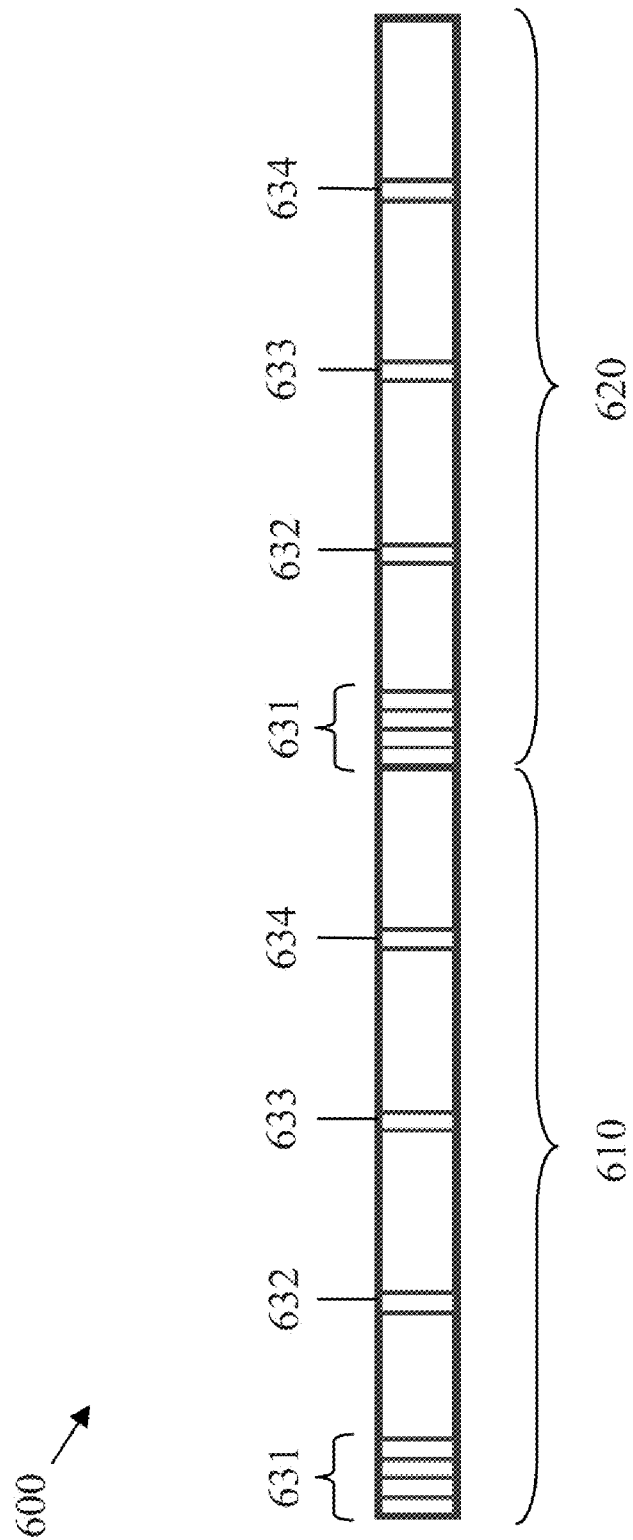
FIG. 6 is a schematic diagram of an embodiment of a plurality of signal band pilot tones.

FIG. 6 illustrates an embodiment of a SBPT signal 600 that may be inserted and transmitted in the PM optical signal, e.g. in the PM coherent optical communications system 400. The PM optical signal may comprise a plurality of data blocks that comprise a first data block 610 and a second data block 620, which may be transmitted subsequently as shown in FIG. 6. The first data block 610, the second data block 620, and similarly other transmitted data blocks (not shown) may comprise a plurality of SBPTs that correspond to the SBPT signal 600 in the PM optical signal. Specifically, the SBPTs may comprise a plurality of symbols in each of the first data block 610, the second data block 620, and other data blocks.

For instance, the SBPTs in each of the data blocks may comprise a first set of symbols 631, a second set of symbols 632, a third set of symbols 633, and a fourth set of symbols 634, which may each correspond to a different signal component of the PM optical signal. The sets of symbols may be repeated and distributed (e.g. separated by other data symbols) in a plurality of subsequent data blocks. For example, the SBPTs may comprise a first set of symbols 631, a second set of symbols 632, a third set of symbols 633, and a fourth set of symbols 634 in the first data block 610. Similarly, the SBPTs may also comprise the first set of symbols 631, the second set of symbols 632, the third set of symbols 633, and the fourth set of symbols 634 in the second data block 620.

Further, the first set of symbols 631 may comprise more symbols than the remaining sets of symbols in the same data block. For instance, the first set of symbols 631 may comprise about 16 symbols in each of the first data block 610 and the second data block 620. In FIG. 6, each about four symbols in the each set is represented by a slot or sub-block. The remaining sets of symbols, e.g. the second set of symbols 632, the third set of symbols 633, and the fourth set of symbols 634, in the same data block may each comprise about four symbols. As such, the SBPT signal 600 may have a frequency tone or symbol rate that may be equal to about $\frac{1}{4}^{th}$, about $\frac{1}{8}^{th}$, or about $\frac{1}{16}^{th}$ of the symbol rate of the data stream in the PM optical signal. In other embodiments, the SBPT signal 600 may have a different frequency and/or period, e.g. may comprise a different quantity of symbol sets and/or symbols in each data block, which may be configured to meet the receiver's DSP requirements without adding substantial overhead.

Figure 7:
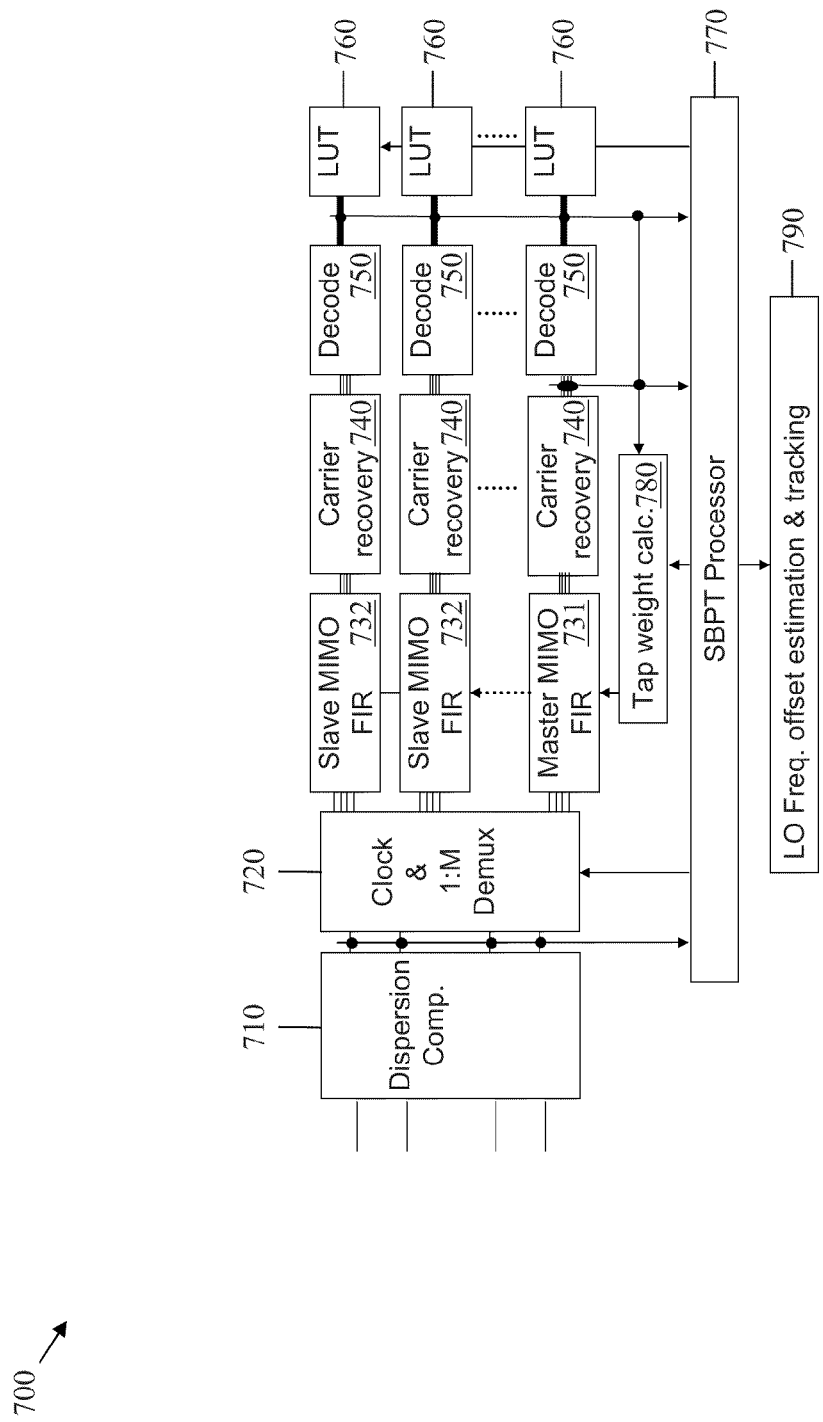
FIG. 7 is a schematic diagram of another embodiment of a receiver digital signal processing unit.

FIG. 7 illustrates an embodiment of a receiver DSP unit 700, which may be used to process a received PM optical signal comprising a SBPT signal and use the SBPT signal to estimate the carrier frequency and/or correct the phase of the received signal, e.g. to retrieve the initial phase of the original transmitted signal. For instance, the receiver DSP unit 700 may correspond to the DSP unit 426 in the receiver 420 of the PM coherent optical communications system 400. The receiver DSP unit 700 may comprise a dispersion compensator 710, a clock and 1:M Demux unit 720, a master multiple-input and multiple-output (MIMO) equalizer 731, a plurality of slave MIMO equalizers 732, a plurality of carrier recovery units 740, a plurality of decoders 750, a plurality of look-up tables (LUTs) 760, a SBPT signal processor 770, a tap weight calculator 780, and a LO frequency offset estimation and tracking unit 790.

The components of the receiver DSP unit 700 may be arranged and coupled to each other as shown in FIG. 7. Specifically, the master MIMO equalizer 731 and the slave MIMO equalizers 732 may be coupled in parallel to a plurality of output channels of the clock and 1:M Demux unit 720. Each of the master MIMO equalizer 731 and the slave MIMO equalizers 732 may also be coupled in series to a carrier recovery unit 740, a decoder 750, and a LUT 760, e.g. in that order. The master MIMO equalizer 731, the slave MIMO equalizers 732, and at least some of the remaining components of the receiver DSP unit 700 may be configured to implement a sequence loop to improve carrier frequency and/or phase estimation, as described below.

The dispersion compensator 710 may be configured to receive a plurality of signal components of the PM optical signal, e.g. XI, XQ, YI, and YQ, and process the signal components to reduce or cancel the dispersion effects in the signal components. For example, the dispersion compensator 710 may receive the signal components from the 90° mixer 422. The received signal components may be mixed with a LO carrier frequency signal, e.g. from the LO 428. The dispersion compensator 710 may then forward the signal components to the clock and 1:M Demux unit 720. The outputs of the dispersion compensator 710 may also be sent to SBPT signal processor 770 to process the SBPT signal in the received signal components.

The clock and 1:M Demux unit 720 may be configured to shift the position of the data blocks in the received signal components from the dispersion compensator 710 to align the SBPT signal properly, e.g. in a known and ordered symbol sequence, for further processing. The clock and 1:M Demux unit 720 may receive a feedback signal, as a step in the sequence loop, from the SBPT signal processor 770 to properly shift the data blocks. Additionally, the clock and 1:M Demux unit 720 may demultiplex or separate the data blocks that correspond to the different signal components into a plurality of corresponding sub-blocks that may be distributed between the master MIMO equalizer 731 and the slave MIMO equalizers 732. For instance, each of the master MIMO equalizer 731 and the slave MIMO equalizers 732 may receive a sub-block that corresponds to a different signal component, e.g. XI, XQ, YI, or YQ.

The master MIMO equalizer 731 and the slave MIMO equalizers 732 may each receive a corresponding sub-block from each of the data blocks in the signal components. In an embodiment, the master MIMO equalizer 731 and the slave MIMO equalizers 732 may comprise a plurality of finite impulse response (FIR) filters. Each of the sub-blocks may comprise a known portion of the SBPT signal, e.g. a plurality of known and ordered SBPT symbols, which may be used for training the corresponding MIMO equalizer 731 and slave MIMO equalizers 732 and initial carrier frequency and/or phase estimation. The initial phase may be estimated based on the known symbols of a SBPT signal, for instance by subtracting a known symbol phase of a SBPT signal from the received sample's phase. As such, the symbols may be placed or aligned correctly and phase ambiguity may be substantially eliminated. Since a portion of the SBPT signal may be pre-positioned into each block in the data stream, the phase estimation based on known SBPT symbols may also limit the length of phase error propagation and the length of possible burst errors due to cycle slip.

Subsequently in the sequence loop for carrier frequency and/or phase estimation, the master MIMO equalizer 731 may receive updated tap weight values from the tap weight calculator 780 and use the updated values to update carrier frequency and/or phase estimation. The updates at the master MIMO equalizer 731 may then be used to update the slave MIMO equalizers 732. For example, the known symbols of the SBPT signal may be used to form error signals to train MIMO equalizer 731 using a Least-Mean Squared (LMS) algorithm. After the master MIMO equalizer 731 reaches a convergence, a decision directed LMS may be switched on and used for all received samples.

The recovery units 740 may be configured to correct the carrier frequency and/or phase in the received data streams from the master MIMO equalizer 731 and the slave MIMO equalizers 732 based on the carrier frequency and/or phase estimation from the corresponding MIMO equalizer 731 and slave MIMO equalizers 732. As such, the recovery units 740 may correct the timing of the received signal components, which may be offset due to fiber dispersion and/or polarization mode dispersion (PMD) effect, e.g. in the optical channel 430. The output signals from the recovery units 740 may then be sent to the decoders 750, which may process and decode the signals. The master MIMO equalizer 731, the slave MIMO equalizers 732, the carrier recovery units 740, and/or the decoders 750 may process the signal data blocks using the information or parameters (e.g. symbol phase) in the corresponding LUTs 760. The outputs of the decoders 750 and/or the outputs of the recovery units 740 may be forwarded to the SBPT signal processor 770 and the tap weight calculation unit 780, e.g. as a step in the sequence loop. The contents of the LUTs 760 may also be updated based on feedback from the SBPT signal processor 770.

The SBPT signal processor 770 may be configured to obtain or extract the position of the SBPT signal (e.g. the SBPT symbols) from the outputs of the dispersion compensator 710 and the carrier frequency offset and/or symbol phase from the outputs of the decoders 750, the carrier recovery units 740, or both. For instance, the SBPT signal processor 770 may use an autocorrelation function to process the data blocks of the received signal components based on the known and ordered symbol sequence of the SBPT signal. The SBPT signal processor 770 may send the position of the SBPT signal to the clock and 1:M Demux unit 720, the symbol phase to the LUTs 760, and the carrier frequency offset to the LO frequency offset estimation and tracking unit 790. The SBPT processor 770 may also send at least some of the extracted information to the tap weight calculator 780, which may use this information to update the tap weight values and hence train or initialize the master MIMO equalizer 731, which may in turn update the slave MIMO equalizers 732.

The LO frequency offset estimation and tracking unit 790 may be configured to estimate the carrier frequency offset in the received signals. For example, the SBPT signal may comprise clock-wise or counter-clockwise QPSK symbols, which may be spinning at the pilot tone frequency and expressed as:

$$S_x = S_0 \cdot \exp(j \cdot 2\pi f_{SBPT} t)$$

where $S_x$ is the transported time dependent SBPT signal, $S_0$ is the amplitude of the SBPT signal, $f_{SBPT}$ is the frequency of the SBPT signal, and t designates the time instance. As such, in a intradyne coherent receiver, the received SBPT signal, $D_x$, may be expressed as:

$$D_x = S_0 \exp(j \cdot 2\pi (f_{SBPT} + \Delta f) t)$$

where $\Delta f$ is a LO frequency offset. The LO frequency offset may be obtained by sweeping the center frequency of a SBPT band-pass filter or locating the SBPT signal in the frequency domain. Such carrier frequency offset estimation scheme may be simpler to implement than a power-to-the fourth algorithm that has been previously used for initial frequency offset estimation, such as described by A. Leven, et al in "Frequency Estimation in Intradyne Reception", IEEE Photonics Tech. Letters, Vol. 19, No. 6, 2007, which is incorporated herein by reference as if reproduced in its entirety.

Figure 8:
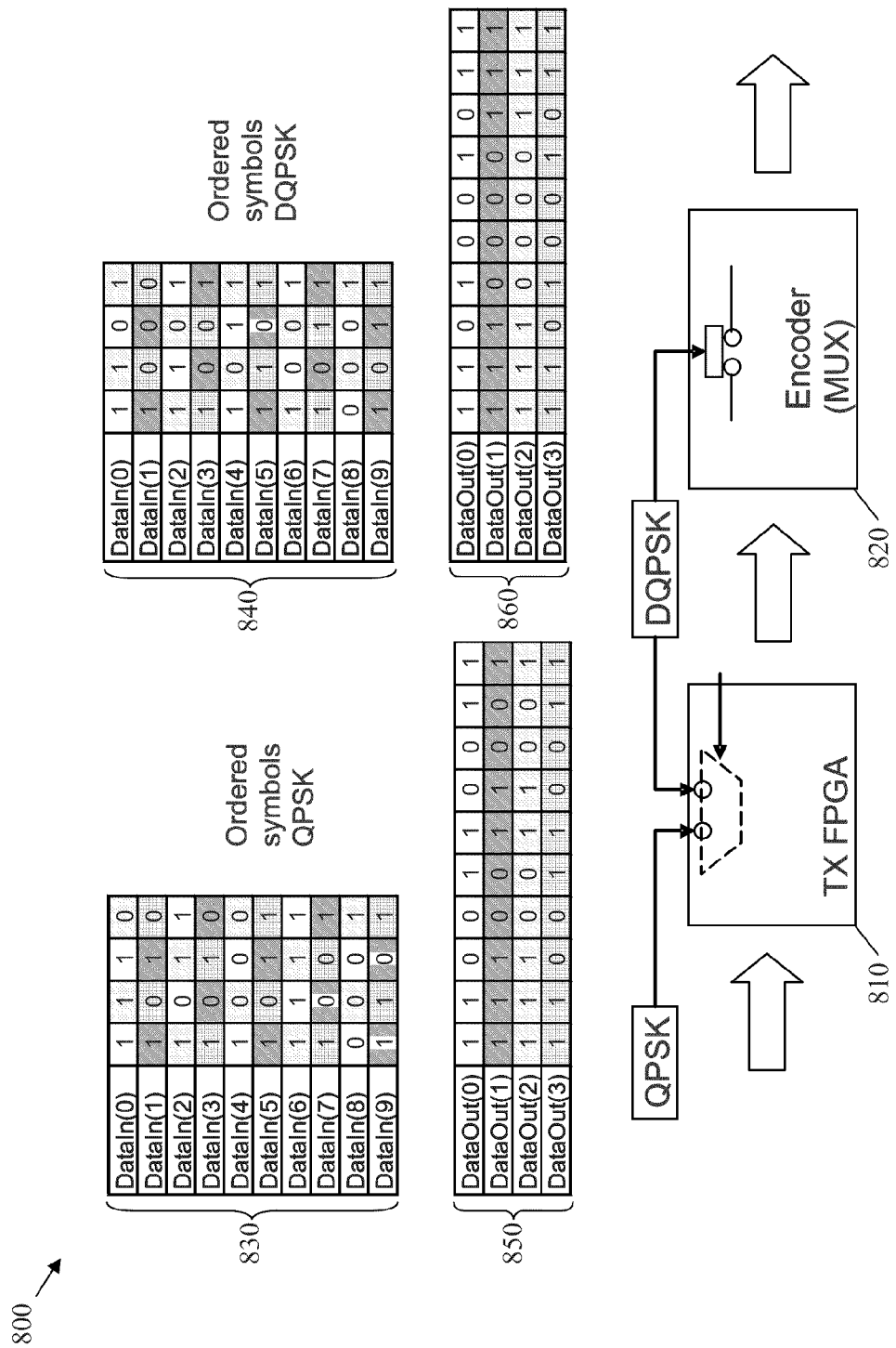
FIG. 8 is a schematic diagram of an embodiment of a transmission scheme.

FIG. 8 illustrates an embodiment of a transmission scheme 800, which may be used to insert a SBPT signal in a PM optical signal before transmitting the signal down the optical channel. For instance, the transmission scheme 800 may be used in the transmitter 410 of the PM coherent optical communications system 400. The transmission scheme 800 may use a transmitter (TX) field-programmable gate array (FPGA) 810 and an encoder 820 to insert the SBPT signal in the transmitted PM optical signal, which may correspond to the SBPT signal control unit 412 and the Mux 414, respectively. The TX FPGA 810 may generate a plurality of ordered QPSK symbols 830, a plurality of ordered DQPSK symbols 840, or other modulated symbols (not shown) in a plurality of corresponding data stream.

The encoder 820 may map the data streams from the TX FPGA 810 into a plurality of fewer data streams, e.g. to simplify the ordered symbol sequence for data-aided DSP, reduce sampling rate, or both. As such, the ordered QPSK symbols 830 or the ordered DQPSK symbols 840 may be multiplexed into a plurality of fewer first ordered symbols 850 or a plurality of fewer second ordered symbols 860, respectively. For example, the TX FPGA 810 may generate about ten ordered QPSK symbols 830 or about ten ordered DQPSK symbols 840, which may be multiplexed by the encoder 820 to transmit about four first ordered symbols 850 or about four second ordered symbols 860, respectively. To insert the SBPT signal in the PM optical signal, the TX FPGA 810 may position the ordered QPSK symbols 830 in the signal data blocks before multiplexing the data streams into fewer data streams. Alternatively, the encoder 820 may position the second ordered symbols 860 in the signal data blocks after multiplexing the data streams into fewer data streams.

Figure 9:
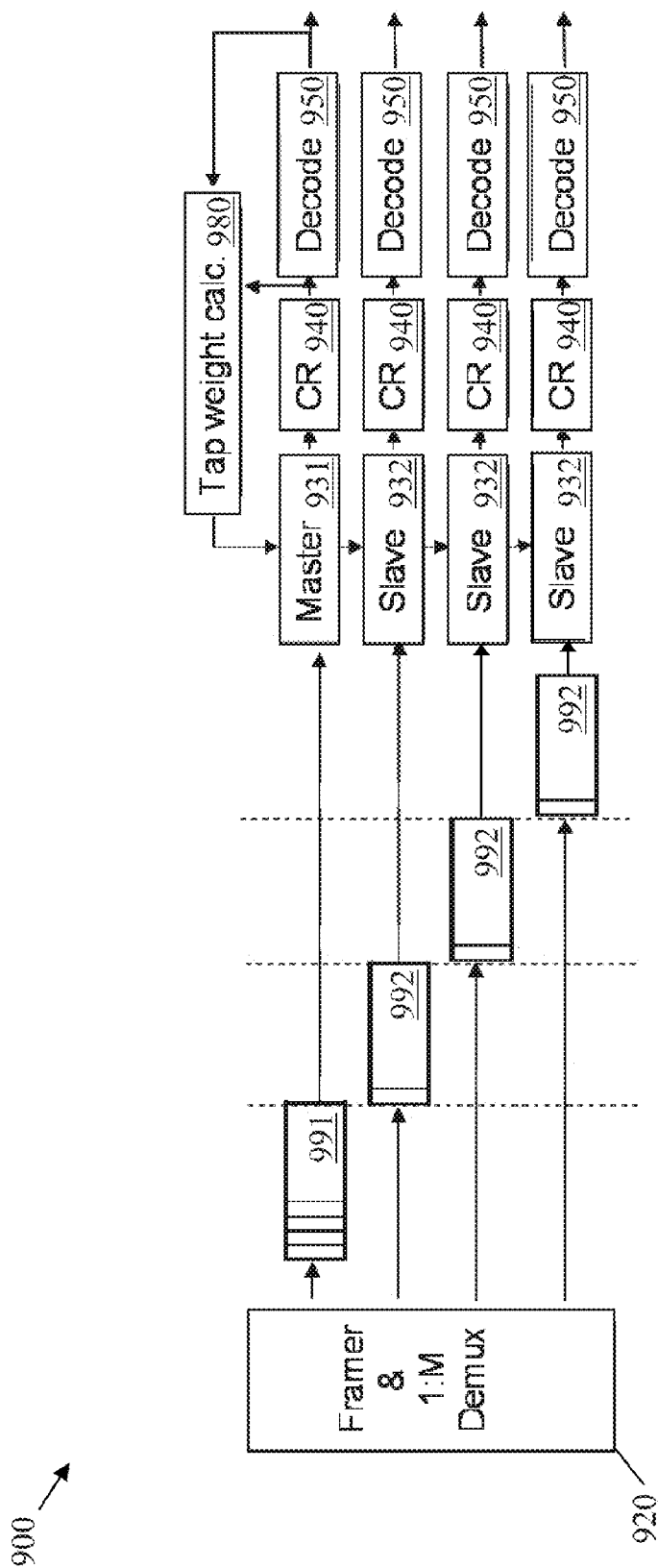
FIG. 9 is a schematic diagram of an embodiment of a reception scheme.

FIG. 9 illustrates an embodiment of a reception scheme 900, which may be used to process the SBPT signal in the PM optical signal for carrier frequency and/or phase estimation. For instance, the reception scheme 900 may be used in the receiver DSP 700, e.g. of the receiver 420, to train some of the receiver components based on a sequence loop and thus improve carrier frequency and/or phase estimation. The reception scheme 900 may use a framer and 1:M Demux 920, a master processor 931, a plurality of slave processors 932 parallel to the master processor 931, a plurality of corresponding carrier recovery (CR) units 940, a plurality of corresponding decoders 950 coupled to the CR units 940, and a tap weight calculator 980, which may be arranged as shown in FIG. 9. The components used in the reception scheme 900 may be configured substantially similar to the corresponding components of the receiver DSP unit 700.

The reception scheme 900 may be configured to implement a DSP algorithm that supports parallel processing, which may be feasible for ASIC implementation, to reduce the use of hardware resources, and/or to reduce power, for instance in high speed optical communication (e.g. at kilohertz (kHz) or megahertz (MHz) data rates). Specifically, the framer and 1:M Demux 920 may demultiplex each received data block into a first sub-block 991 that may be sent to the master processor 931 and a plurality of second sub-blocks 992 that may be sent separately to the corresponding slave processor 932. As such, the quantity of sub-blocks may correspond to the quantity of parallel processors, e.g. about four sub-blocks in each data block and about four corresponding parallel processors (including the master processor 931). The first sub-block 991 may comprise a first portion of the SBPT signal, e.g. the first set of symbols 631, and each of the sub-blocks 992 may comprise a remaining portion of the SBPT signal, e.g. the second set of symbols 632, the third set of symbols 633, and the fourth set of symbols 634. There is no data overlap between any of the first sub-block 991 and the sub-blocks 992.

The master processor 931 and the slave processors 932 may process the corresponding SBPT symbols independently to estimate the frequency offset and/or correct the phase in the signal. The master processor 931 and the slave processors 932 may process the corresponding SBPT symbols iteratively in a sequence loop to improve the carrier frequency and/or phase estimation, where the master processor 931 may be trained and updated at each iteration based on the output of the corresponding decoder 950. The output of the decoder 950 may be processed by the tap weight calculator 980 to update the estimation parameters of the master processor 931. Subsequently, at each iteration the master processor 931 may train and update the slave processors 932, e.g. without using additional system resources. As such, the reception scheme 900 may provide parallel processing of the separate sub-blocks in each received data block of the PM optical signal and save hardware resources, system complexity, and/or cost.

Since the master processor 931 may need tap weight updates and the slave processors 932 may inherit the tap weight updates from the master processor 931, the first portion of the SBPT signal in the first sub-block 991 may comprise more contiguous SBPT symbols, e.g. greater than or equal to about three, than the remaining portions of the SBPT signal in the second sub-blocks 992.

When the output of the master processor 931 converges, the output of the slave processors 932 may also converge, and the training of the parallel processors may be completed. Consequently, the reception scheme 900 may achieve optimal phase and/or frequency offset recovery, where any subsequently received signals may be processed using the last updated parameters of the parallel processors, e.g. without further training of the master processor 931 and the slave processors 932.

Figure 10:
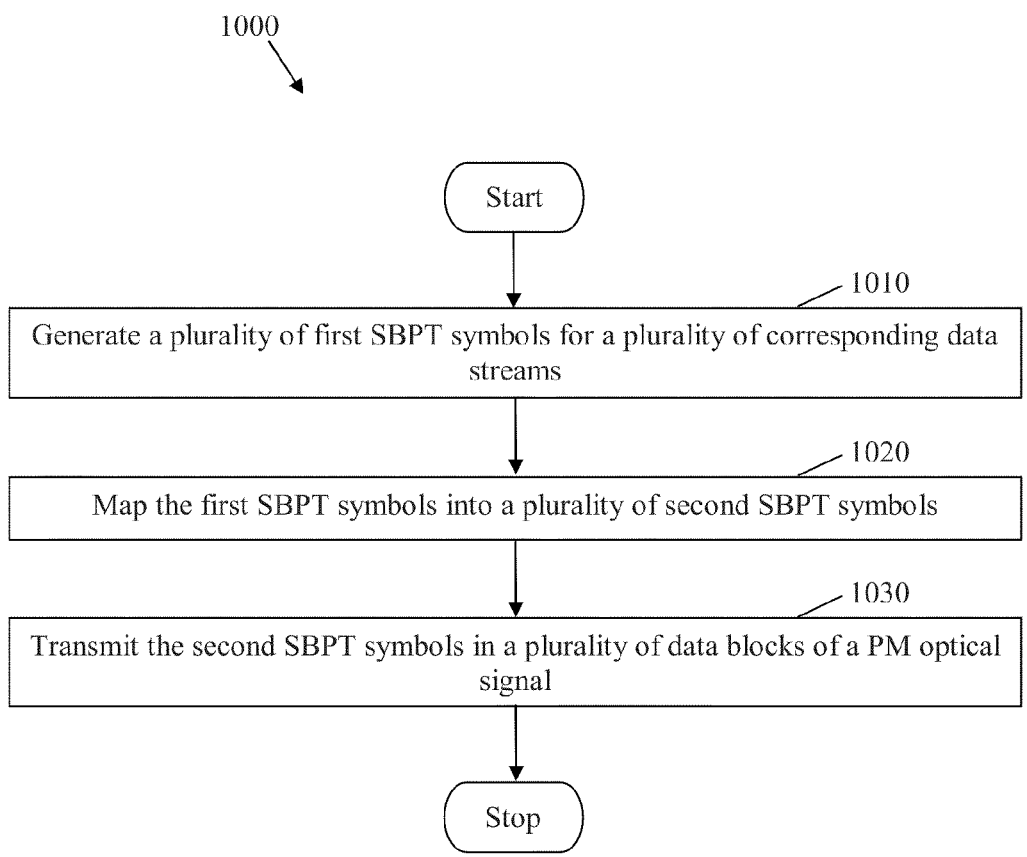
FIG. 10 is a flowchart of an embodiment of a transmission method.

FIG. 10 is a flowchart of one embodiment of a transmission method 1000, which may be used to insert a SBPT signal in a PM optical signal, for instance in the transmission scheme 800. The method 1000 may begin at block 1010, where a plurality of first SBPT symbols may be generated for a plurality of corresponding data streams. For example, the TX FPGA 810 may generate about ten first SBPT symbols (e.g. QPSK or DQPSK symbols) that correspond to about ten input data streams. At block 1020, the first SBPT symbols may be mapped into a plurality of second SBPT symbols, which may correspond to the signal components of the PM optical signal. For example, the encoder 820 may map the about ten first SBPT symbols into about four second SBPT symbols. At block 1030, the second SBPT symbols may be transmitted in a plurality of data blocks of a PM optical signal. For instance, the about four second SBPT symbols may be inserted in the beginning of each data block in the PM optical signal and at least some of the about four second SBPT symbols may be distributed across each data block, e.g. to achieve a selected SBPT signal rate. The method 1000 may then end.

Figure 11:
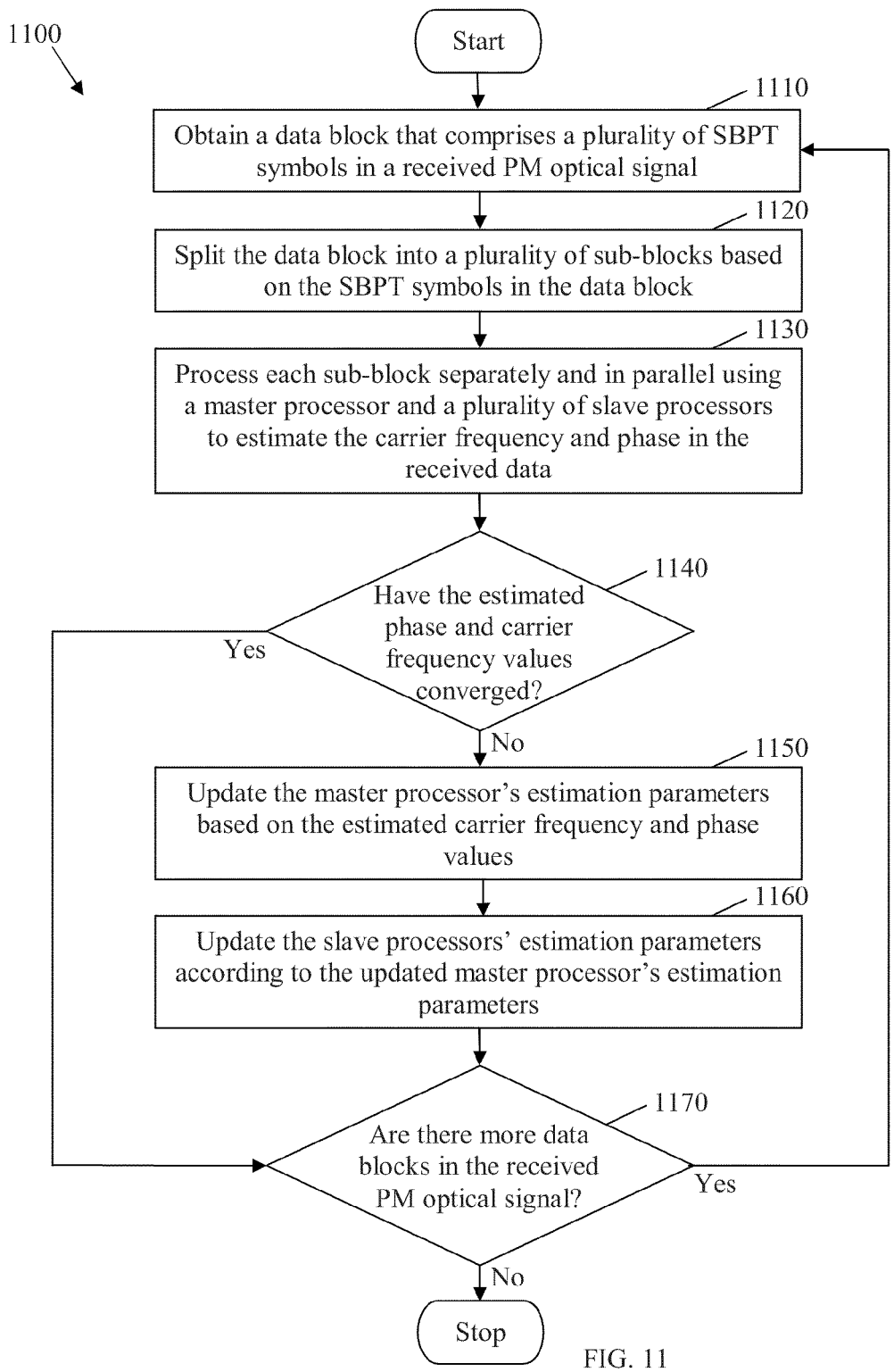
FIG. 11 is a flowchart of another embodiment of a reception method.

FIG. 11 is a flowchart of one embodiment of a reception method 1100, which may be used to process a SBPT signal in the PM optical signal for carrier frequency and/or phase estimation, for instance in the reception scheme 900. The method 1100 may begin at block 1110, where a data block that comprises a plurality of SBPT symbols may be obtained in a received PM optical signal. For example the framer and 1:M Demux 920 may obtain the next data block (e.g. block 610 or block 620) in a received PM optical signal. At block 1120, the data block may be split into a plurality of sub-blocks based on the SBPT symbols in the data block. For example, the framer and 1:M Demux 920 may separate the data block into the first sub-block 991 and the second sub-blocks 992. At block 1130, each sub-block may be processed separately and in parallel using a master processor and a plurality of slave processors to estimate the carrier frequency and phase in the received data. For example, the framer and 1:M Demux 920 may forward the first sub-block 991 to the master processor 931 and each of the second sub-blocks 992 to a corresponding slave processor 932, which may process the sub-blocks as described above.

At block 1140, the method 1100 may verify whether the estimated phase and carrier frequency values have converged. If the estimated phase and carrier frequency values have converged, then the method 1100 may proceed to block 1170. Otherwise, the method 1100 may proceed to block 1150. At block 1150, the master processor's estimation parameters may be updated based on the estimated carrier frequency and phase values. For example, the estimation parameters of the master processor 931 may be updated by the tap weight calculator 980 using the output of the decoder 950 of the receiver DSP unit 700. Similarly, the master MIMO equalizer 731 may receive updated tap weight values from the tap weight calculator 780 and use the updated values to update carrier frequency and/or phase estimation. The tap weight values from the tap weight calculator 780 may be updated by the SBPT signal processor 770 and/or the LO frequency offset estimation and tracking unit 790, e.g. based on the outputs from the dispersion compensator 710, the decoders 750, the carrier recovery units 740, or combinations thereof.

At block 1160, the slave processors' estimation parameters may be updated according to the updated master processor's estimation parameters. For example, after being updated, the master processor 931 may update the slave processors 932 without using additional system resources, e.g. without using the tap weight calculator 980. Similarly, the master MIMO equalizer 731 may update the slave MIMO equalizers 732 after being updated by the tap weight calculator 780. At block 1170, the method 1100 may verify whether there are more data blocks in the received PM optical signal. If the condition in block 1170 is satisfied, then the method 1100 may return to block 1110 to process another data block in the received PM optical signal. Otherwise, the method 1100 may end.

Figure 12:
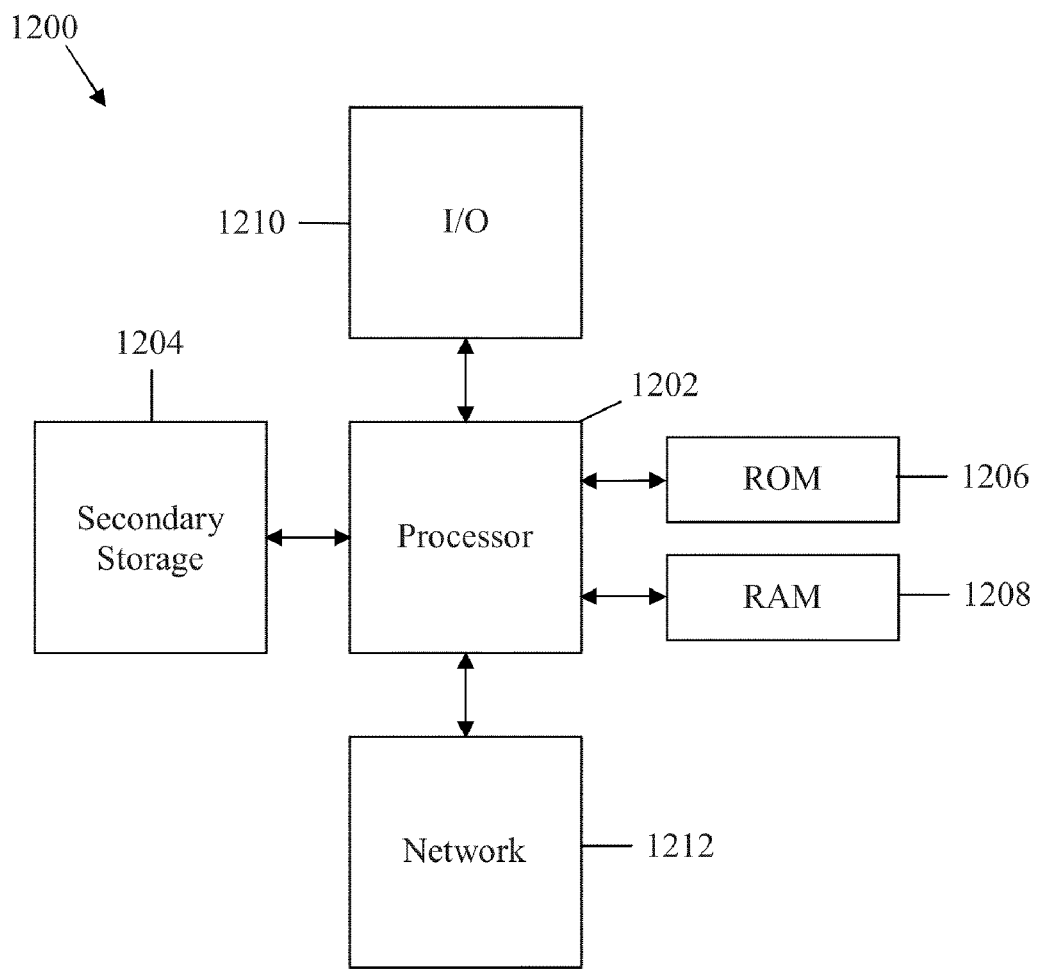
FIG. 12 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips, or may be part of one or more ASICs.

The secondary storage 1204 is typically comprised of one or more disk drives or tape drives and is used for non-volatile storage of data and as an overflow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 75 percent, 76 percent, 77 percent, 78 percent, 77 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a master processor configured to estimate phase and carrier frequency in a first portion of a received signal;
   a plurality of slave processors configured to estimate phase and carrier frequency in a plurality of second portions of the received signals;
   a demultiplexer coupled to each of the master processor and the slave processors and configured to distribute the first portion and the second portions in parallel between the first processor and the slave processors;
   a plurality of carrier recovery units coupled in parallel to the master processor and the slave processors;
   a plurality of decoder units coupled in parallel to the carrier recovery units; and
   a tap weight calculator coupled to the master processor and one of the decoders that corresponds to the master processor and configured to update the tap weight of master and slave equalizers.

2. The apparatus of claim 1 further comprising a side band pilot tone (SBPT) signal processor coupled to the tap weight calculator and one of the decoders that corresponds to the master processor, and configured to detect and align an SBPT signal in the first portion and the second portions.

3. The apparatus of claim 2 further comprising a linear oscillator (LO) frequency offset estimation and tracking unit coupled to the SBPT signal processor and configured to estimate a carrier frequency offset in the received signal.

4. The apparatus of claim 2 further comprising a plurality of look-up tables (LUTs) coupled in parallel to the decoders and the SBPT signal processor and configured to maintain phase information for the corresponding master processor and slave processors.

5. The apparatus of claim 2, wherein the slave processors are coupled to the master processor but are not coupled to the tap weight calculator and the SBPT signal processor.

6. The apparatus of claim 2 further comprising a dispersion compensator coupled to the demultiplexer and the SBPT signal processor and configured to reduce dispersion effects in the received signal.

7. The apparatus of claim 2, wherein the master processor, the slave processors, the demultiplexer, the carrier recovery units, the decoders, the tap weight calculator, and the SBPT signal processor are located in a digital signal processing (DSP) unit in an optical receiver, wherein the DSP unit is coupled to a mixer and a LO, and wherein the mixer is configured to mix the received signal with a LO signal that has about the same carrier frequency of the received signal.

8. The apparatus of claim 2, wherein the received signal is a polarization multiplexed (PM) optical signal that comprises about four orthogonal signal components, wherein the PM optical signal comprises a plurality of SBPT symbols, and wherein the first portion of the received signal comprises more SBPT symbols that each of the second portions of the received SBPT signal.

9. The apparatus of claim 2, wherein the received signal is a polarization multiplexed (PM) optical signal that comprises about four orthogonal signal components, wherein the PM optical signal comprises a plurality of SBPT symbols, and wherein the SBPT symbols have a symbol rate that is about $1/4^{th}$, about $1/8^{th}$, or about $1/16^{th}$ the symbol rate of a data stream in the PM optical signal.

* * * * *